Aug. 14, 1934.  E. BLAMBERG  1,970,162

REVERSIBLE INDUCTION MOTOR

Filed July 11, 1931

INVENTOR;

Ernst Blamberg;

By Harold D. Penney  ATTORNEY.

Patented Aug. 14, 1934

1,970,162

UNITED STATES PATENT OFFICE 1,970,162

REVERSIBLE INDUCTION MOTOR

Ernst Blamberg, Frankfort-on-the-Main, Germany, assignor to Hartmann & Braun Aktiengesellschaft, Frankfort-on-the-Main, Germany, a corporation of Germany Application July 11, 1931, Serial No. 550,114
In Germany July 26, 1930

4 Claims. (Cl. 172—278)

This invention relates to reversible induction motors and has particular reference to devices of that type in which the design and structural arrangements, including dimensions and wiring or circuit elements, are of reduced proportions, such as those of the kind used in measuring or compensating work, and in regulating and recording equipment.

Single-phase motors have heretofore been called upon to run for relatively long periods of time without attendance, and these are preferably built without a commutator, but are designed as self-starting asynchronous or synchronous motors having no current supply lead to connect with the rotor. In order that the motor may be caused to start spontaneously the single-phase field of the single-phase winding must in such a case be changed into a rotary or polyphase field. This is accomplished in various ways, one of which consists in the provision of circuit turns upon parts of the stator iron whereby a part of the flux is shifted in phase, relative to the main flux. The direction of rotation of the field is then governed by the disposition of the turns, hence, there is no chance to effect control of the direction of rotation of the motor. But the demand frequently arises in practice for reversible motors of small size.

An important object of this invention, according to one aspect thereof, is the provision of means whereby a small sized single-phase motor may, by external circuit change, be caused to alternately rotate in opposite directions, while incidentally only a small fraction of the total motor power has to be utilized by the said means.

According to another aspect of this invention a further object is the provision of means to cause motors of the reversible induction type to start rapidly, instantaneously, or practically so, and also to stop such motors just as quickly, this being to meet the particular conditions of use, and more especially when the motors, by virtue of special mode of connection, are called upon to alternate in direction of rotation.

Induction motors are known in the prior art as being capable of changing direction of rotation by means of coils which are disposed upon special cores of the poles of the field magnets. When the said cores and the coils wound thereon (known as displacement coils) have been shifted relative to the media axis of the main pole, then the currents induced in the windings set up a shifting magnetic field, whereby the rotor of the motor is rotated.

It has also been suggested in the prior art not to leave these displacement coils permanently connected, but to connect them only whenever this is necessary, by the agency of a switch. According to whether the said switch cuts in circuit a displacement coil shifted towards the front or the rear, will the motor run in the one or in the other direction, on connecting the exciting winding.

In motors of this kind known in the prior art, which, by the way, have failed of attaining any great practical importance, one drawback is that owing to the requisite connection in circuit of the field winding, the starting required considerable switch power. Motors of the said kind, moreover, continue rotating even after the displacement coil in question has been cut out of circuit again. Now, these inconveniences mean little in the ordinary use of these motors in power plants, for it is here immaterial whether the field winding is connected simultaneously with the displacement coil, since sufficiently strong switches are provided for such circuit changing and switch operations.

Conditions become different, however, when measuring instruments are dealt with, for which usually only very small switches or contacts are available. Contacts of this latter kind are unable to produce the switching powers then required, for instance when operated with very feeble measuring instruments such as ammeters, voltmeters, manometers. The large switching powers necessary with such circuit structures as have heretofore been found feasible in the art could be handled only by the intermediary of relays, which have not proved completely satisfactory.

Now, the present invention discloses ways and means adapted for use with induction motors for the said purposes without intermediate relays, even in cases where only very small switch-operating force is available. This is secured, on the one hand, by permanently connecting the exciting winding of the motor with the alternating current supply line, and on the other hand, the starting and stopping of the motor is merely effected by the connection of the displacement coil in question. In order that, when stopping the motor, the rotor may be prevented from continuing rotation for any considerable length of time, the rotor of the motor according to this invention is provided with well known damping means, so dimensioned that after disconnection of the displacement coils, the rotor will be stopped by the existing alternating magnetic field, thereby resulting in quick stops.

With the above indicated objects in view, as well as others, which will become apparent as the description proceeds, the invention resides in certain novel constructions which, including combinations and arrangements of parts, are herein clearly described and fully illustrated in the accompanying drawing, in which:

Fig. 2 is a diagrammatic view of a modified form of motor, this being of the reversible induction type; and Fig. 3 is a diagrammatic view of a further modification of the structure shown in Fig. 2.

Figure 1:
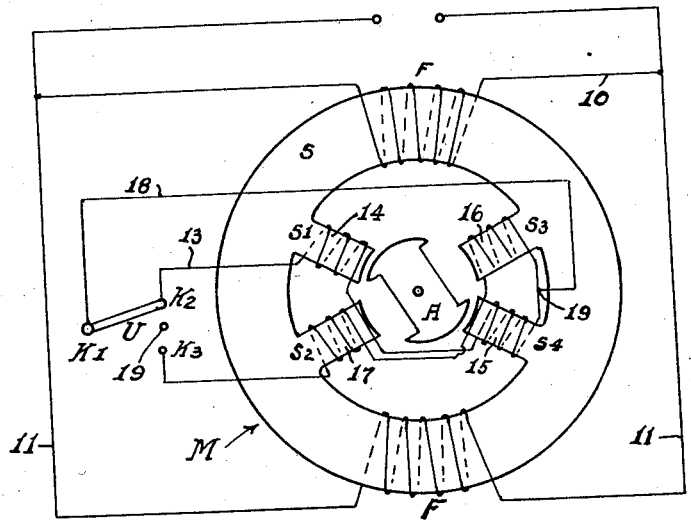
Fig. 1 is a diagrammatic view of a single-phase motor.
Figure 1:
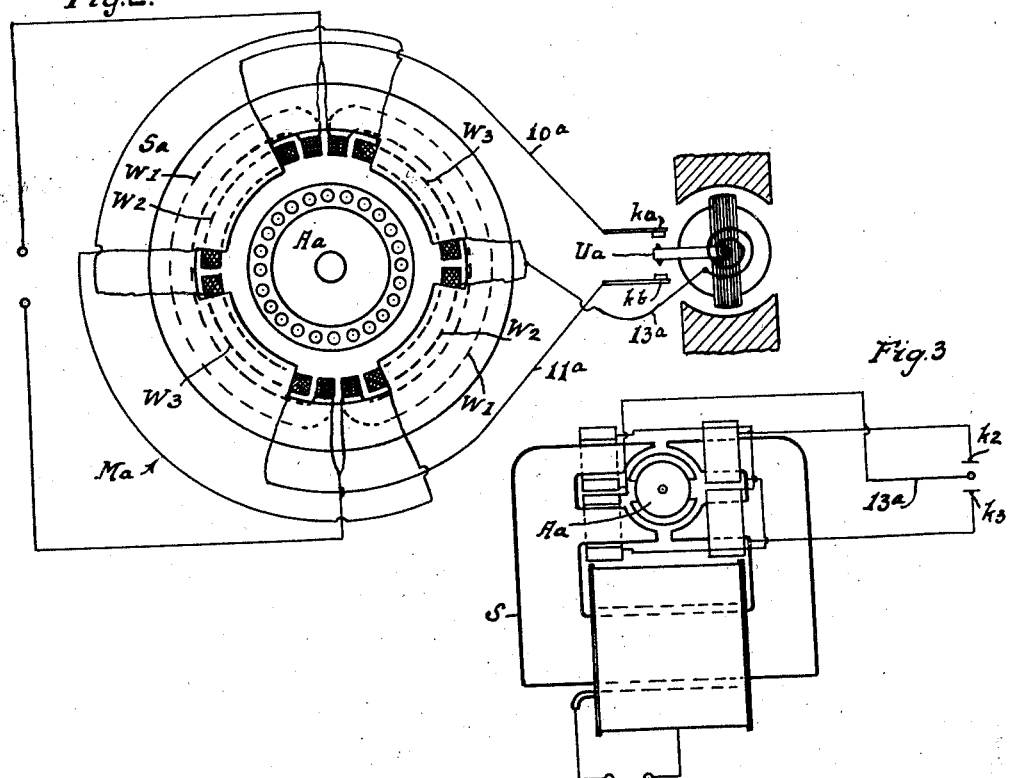
Figure 1:
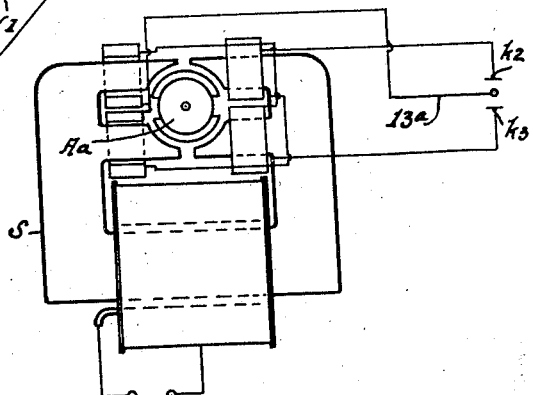

In the embodiment of the invention shown in Fig. 1 the motor M includes an armature A which is revolvable between the pole cores of the stator S, the exciting windings F of which are connected by leads 10, 11 with a single-phase alternating current supply network.

Circuit wiring 13 having a terminal on a contact K2 is wound at S1 on a pole core 14 and at S4 on a core 15, then passing to a core 16 is wound thereon at S3, following which the windings S2 pass over a core 17 to terminate on a contact K3. These open coils may, through a movable switch element U, pivoted on a contact K1, be connected with wiring. In the medial position 19 of the switch element both groups of coils are open.

By connecting K1 and K2 the coils S1 and S4 are also connected, hence, the rotor A turns in one direction; but when K1 and K3 are connected, the coils S2 and S3 are connected, with the result that the rotor turns in the opposite direction. The wiring 18 is connected between the cores 15 and 16. When the coils S1 to S4 remain open, damping being suitably chosen, and the switch element being positioned at 19, the rotor fails to revolve, in fact, it is brought to rest and remains stationary even if the exciting winding F is permanently fed with potential.

As shown in the embodiment of the invention illustrated in Fig. 2, the exterior cylindrical face of the armature Aa of the motor Ma is substantially plain, or without any winding. This armature, which could differ from the particular one shown, rotates between the units of the stator Sa which is furnished with three groups of windings W1, W2, W3. The winding W1 embraces the whole pole and is permanently connected with the alternating current network. The windings W2 and W3 embrace only one-half of the pole surfaces and are not connected with the network. In this case circuit portions 10a and 11a, as well as a connection 13a, are provided, there being also terminals ka, kb and an interposed movable element Ua. When the windings W2 are connected, a field rotating in clockwise direction is produced; and when the windings W3 are connected a field rotating in anti-clockwise direction is set up. When no winding is connected, there exists only an A. C. field, in which, damping being suitable, the rotor will stop.

The energy which is to be handled by the switch upon connecting the windings W2, W3 is only a fraction of the aggregate power, and this power can be safely handled by the normal stop contacts of the structure without difficulty, the proportions of the motor being not unduly large. An arrangement such as that shown in Fig. 3, or a modification of the structure known as the Warren type, will be found advantageous. In this case the principle may be applied to large scale structures without difficulty.

As the hereinbefore described construction admits of further modification, without departing from the invention, the particular arrangements shown should be taken as illustrative, and not in a limiting sense. Therefore, the scope of the protection contemplated should be taken solely from the appended claims, interpreted as broadly as is consistent with the prior art.

I claim as my invention:

1. A miniature motor suitable for control by delicate instruments, said motor comprising an unwound rotor; a single-phase stator, each pole comprising a split core for influencing said rotor; alternating current exciter windings for causing alternating flux in the poles and cores; open-circuit forward and rear shading coils on said cores respectively; and means for selectively short circuiting the forward or rear shading coils, whereby the motor may be caused to rotate in either direction; said rotor being sufficiently small and the damping effect being sufficient during excitation by the exciter windings to stop the rotor immediately when the shading coils are all open circuited.

2. A miniature motor comprising an unwound rotor; a single-phase stator comprising poles each comprising split cores; alternating current exciter windings for said poles; forward and rear shading coils on each of said cores respectively; switch means and conductors for at will selectively connecting diagonally opposite pairs of said coils in series circuit, whereby the motor may be caused to rotate in respectively opposite directions, said rotor being sufficiently small and the damping effect being sufficient during excitation to stop the rotor immediately when the shading coils are all open circuited.

3. A miniature motor comprising an unwound rotor; a single-phase stator comprising poles each comprising split cores; alternating current exciter windings for said poles; forward and rear shading coils on each of said cores respectively; a double throw switch having a movable element and point contacts; conductors connecting diagonally opposite pairs of said coils in series between said movable element and the respective fixed contacts of the switch, whereby the motor may be caused to rotate in respectively opposite directions by engaging said element with the one or the other of said contacts; the amount of current in said shading coils being sufficiently small to be controlled by said point contact when said movable switch element is controlled by the movable element of a delicate instrument; said rotor being sufficiently small and the damping effect being sufficient during excitation to stop the rotor immediately when the shading coils are all in the same circuit condition.

4. A miniature motor comprising an unwound rotor; a single-phase stator comprising poles each comprising split cores; alternating current exciter windings for said poles; forward and rear shading coils on each of said cores respectively; a double throw switch having a movable element; conductors connecting diagonally opposite pairs of said coils in series between said movable element and the respective fixed contacts of the switch, whereby the motor may be caused to rotate in respectively opposite directions by engaging said element with the one or the other of said contacts; said rotor being sufficiently small and the damping effect being sufficient during excitation to stop the rotor immediately when the shading coils are all open circuited, said double throw switch having a completely open position so that said shading coils may be simultaneously opened at once by a single movement of the movable element.

ERNST BLAMBERG.